O. F. CONKLIN.
REGULATING DEVICE FOR DYNAMO ELECTRIC MACHINES.
APPLICATION FILED DEC. 19, 1916.
1,352,051.
Patented Sept. 7, 1920.
2 SHEETS—SHEET 2.
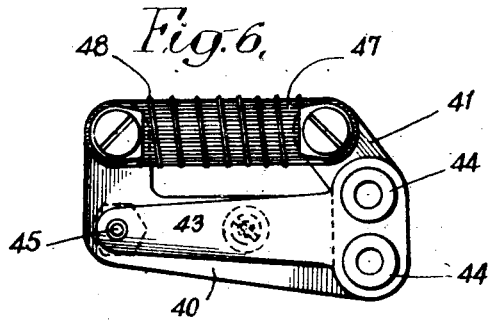
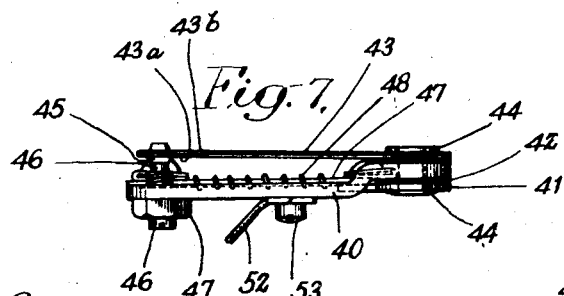
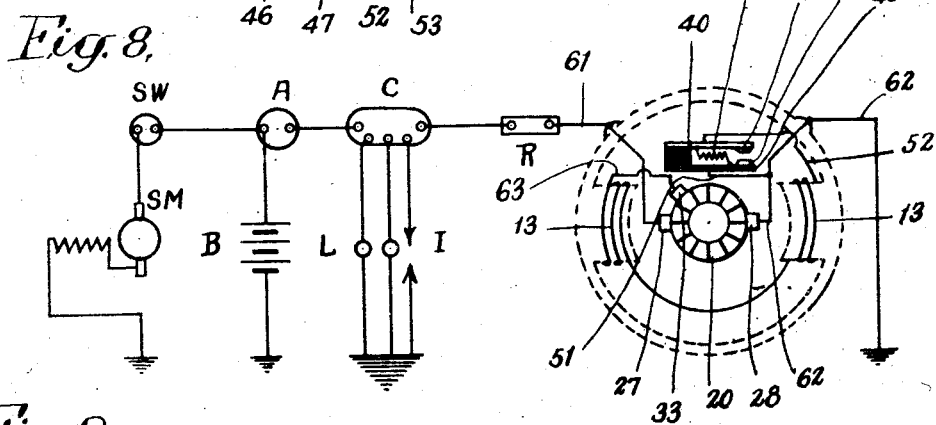
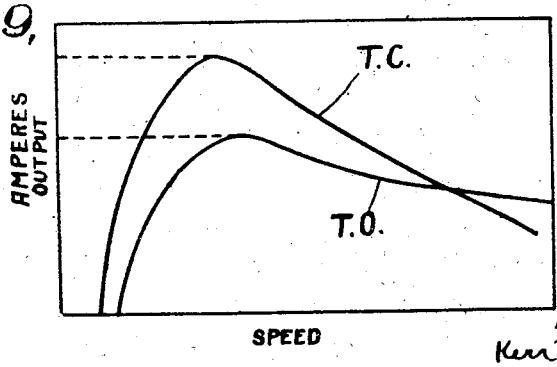
INVENTOR.
Oliver F Conklin
BY
Kerr Page Cooper + Hayward
ATTORNEYS.

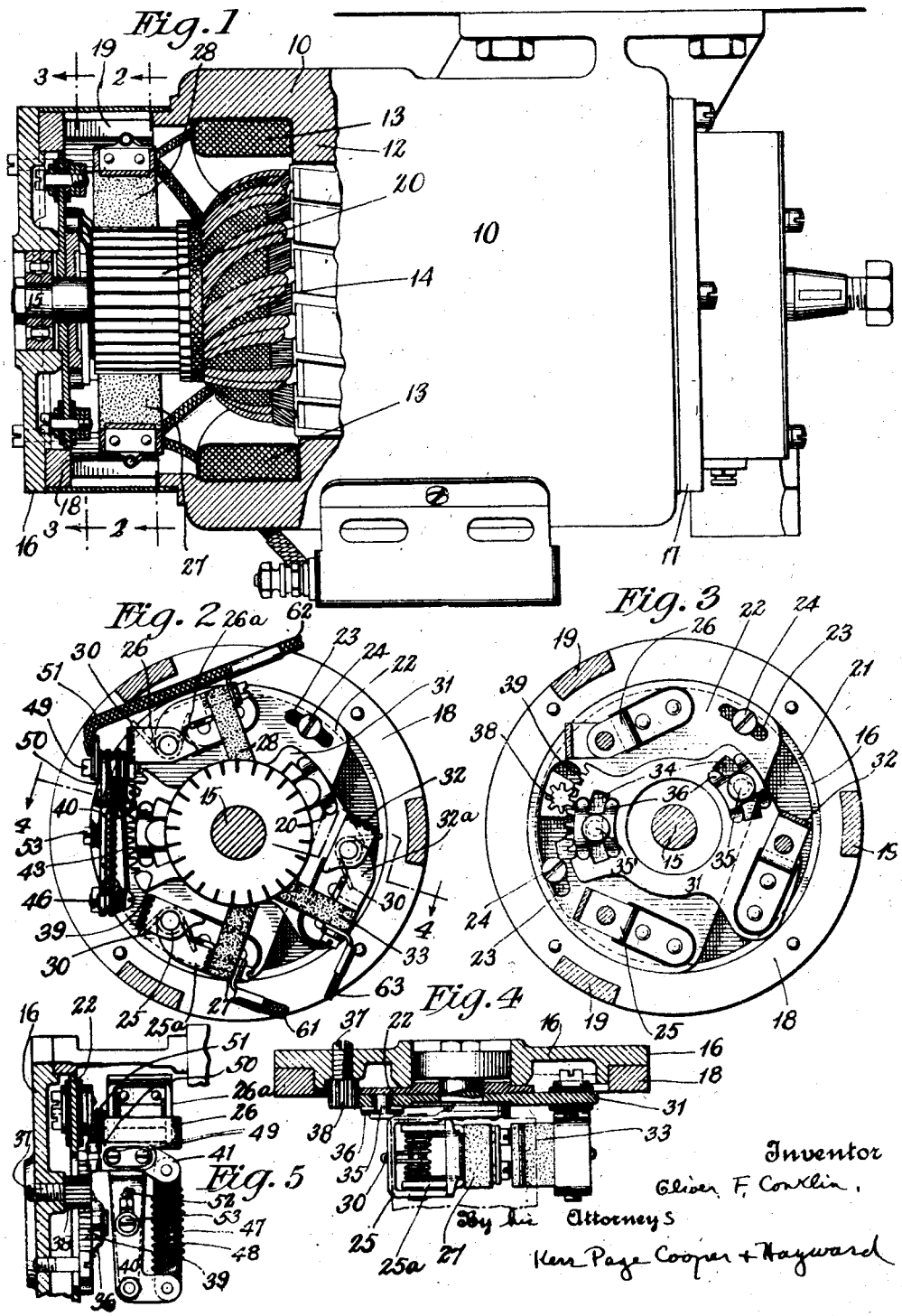

UNITED STATES PATENT OFFICE.

OLIVER F. CONKLIN, OF DETROIT, MICHIGAN, ASSIGNOR TO REMY ELECTRIC COMPANY, OF ANDERSON, INDIANA, A CORPORATION OF INDIANA.

REGULATING DEVICE FOR DYNAMO-ELECTRIC MACHINES.

1,352,051.  Specification of Letters Patent.  Patented Sept. 7, 1920.

Application filed December 19, 1916. Serial No. 137,751.

*To all whom it may concern:*

Be it known that I, OLIVER F. CONKLIN, a citizen of the United States, residing at Detroit, in the county of Wayne and State of Michigan, have invented certain new and useful Improvements in Regulating Devices for Dynamo-Electric Machines, of which the following is a full, clear, and exact description.

This invention relates to improvements in regulating devices for dynamo electric machines, and is particularly adapted for regulating the output of types of machines which are driven at a variable speed and used for charging storage batteries.

In the drawings—

Figure 1 is an elevation of a dynamo electric machine to which my improved regulating device may be attached. This figure shows the commutator end of the machine in section. In this figure parts of the brush holder are omitted, but these holders appear in Figs. 2 and 3.

Fig. 2 is a sectional view of Fig. 1 taken on line 2—2. This view shows the brush holders, the thermostat regulator and associated parts in position on the supporting head plate.

Fig. 3 is a sectional view taken on line 3—3 of Fig. 1, and shows the arrangement of the brush holder supporting plates on the head of the machine.

Fig. 4 is a detail view taken on line 4—4 of Fig. 2, with the commutator and thermostat removed.

Fig. 5 is another detail view showing a top plan view of the thermostat regulating device in position on its brush holder.

Fig. 6 is a detail bottom plan view of the thermostat regulating device. This view shows the thermostat removed from the brush holder for sake of clearness.

Fig. 7 is a side view of the thermostat device shown in Fig. 6.

Fig. 8 shows a circuit diagram of the dynamo electric machine. This view shows the wiring connections to the different brushes, the field coil, the thermostat, the battery and the current consuming devices.

Fig. 9 shows characteristic output curves of a generator equipped with the herein described regulating device.

In more detail, the generator has the usual body portion 10 provided with pole pieces 12 and having associated field coils 13. The armature 14 is mounted on a shaft 15, which is rotatable in ball bearings in the heads 16 and 17. Head plate 16 is supported on an annular boss 18, which is connected with the body by bracket portion 19. The armature 14 is provided with the usual commutator 20, and this commutator conducts the current produced in the armature to the various brushes.

Upon the inner face of head plate 16 is mounted a brush holder base plate 22. This plate is slotted as shown at 23 to receive screws 24 which take into the head plate 16. By loosening these screws the plate 22 may be angularly adjusted with respect to the head plate 16. Mounted on plate 22 and insulated therefrom are brackets 25 and 26 which pivotally support brush holders 25$^a$ and 26$^a$ carrying brushes 27 and 28. The brushes are yieldingly held against the commutator by means of coil springs 30 which coöperate with the brackets and the brush holders in the manner shown in Fig. 4. Superposed on plate 22 is a second brush holder base plate 31 which carries insulated bracket 32 supporting brush holder 32$^a$ and third brush 33 in the manner just described. Plate 31 is slotted as shown at 34, and through these slots project studs 35, which are carried by plate 22. Spring members 36 coöperate with the studs and plate 31 to yieldingly hold said plate against plate 22. The tension of these springs is sufficient to normally prevent independent movement of plate 31 and plate 22, but should it be desired to shift plate 31 angularly relative to plate 22, this can be accomplished by applying a screw driver to stud 37 which projects through end plate 16. See Figs. 4 and 5. Stud 37 carries on its inner end a pinion 38, which is adapted to mesh with sector teeth 39 on the periphery of plate 31. The means just described provide a ready means to adjust the brushes. By loosening screws 24 and then turning stud 37 by means of a screw driver, all three of the brushes, namely, 27, 28 and 33 may be shifted angularly with respect to the commutator. This adjustment it will be understood is used in assembling the device. After this adjustment has been made and screws 24 tightened, stud 37 can be turned to shift plate 31 angularly with respect to plate 22. This adjustment changes the relative location of the third or regulating brush 33 with respect to the other brushes 28 or 27. The purpose of this adjustment is to regulate the maximum current output of the machine in the manner well known in "third brush" regulated machines.

Thermostat regulating device.

Attached to brush holder 26, and insulated therefrom, is the thermostat regulating device. The thermostat comprises three main parts, a frame member, a resistance element and a bimetallic thermostatic element. The frame member 40 is substantially L-shaped and has secured to one end thereof an angle piece 41. The end of the piece 41 projects to one side of the frame member 40, as clearly shown in Figs. 5 and 6. The angle piece is preferably insulated from the frame member by a strip of insulating material 42. Also secured to the frame member and insulated therefrom by insulating strip 42 is the bimetallic thermostatic member 43 comprising two metallic strips 43$^a$ and 43$^b$ secured together throughout their length, as by soldering or fusing. The two strips 43$^a$ and 43$^b$ are made of metals having varying coefficients of expansion. The frame member, the angle piece thermostatic element and insulating strips are preferably all held together by hollow rivets 44. At the end opposite from rivets 44 the thermostatic element carries a contact 45 adapted to establish or break an electrical current with an adjustable contact 46 on the L-shaped frame 40 nearby. Contact 46 is adjustable, it being threaded into the frame member and after the adjustment is once made the contact may be locked by means of the nut 47. I also prefer to "seal" the adjustment by soldering contact 46, nut 47 and frame member 40 together. Bridging the space between the L portion of frame member 40 and angle piece 41 is a mica strip 47 carrying a resistance wire 48 thereon. The resistance wire at its ends is connected with suitable clips which, through the fastening screws for the mica strip, establish an electrical connection with the L-shaped end of the frame member 40 and the angle piece 41.

It will be understood that the device just described forms a "unit." This unit is adapted to fasten to the bracket 26 by screws 49 which pass through the holes in the rivets 44, (see Figs. 2, 5 and 6). The screws also hold in place a terminal clip 50 to which a wire 51 is attached. This wire leads to and connects with the main brush 28, as shown in Figs. 2, 5 and 8. Frame member 40 also has suitably fastened thereto a wire 52 by a screw 53.

It will be understood that the thermostatic element as a "unit" can be removed and replaced by disconnecting the contact wires and removing screws 4. In this way it is possible to replace defective and inaccurate thermostatic elements. The entire unit can be readily removed and a correct unit can be substituted therefor. The adjusting and testing of the units may be carried out before the units are placed in the machine, thereby facilitating the assembling and testing of the generators. By referring to Fig. 2 it will be seen that when the thermostatic unit is in place on its brush holder the bimetallic thermostatic element is disposed adjacent the commutator in such a position that the heat of the commutator will readily be conducted thereto.

The operation of the device will now be described. For clearness, the ensuing explanation will refer to the diagrammatic Fig. 8, similar reference characters being applied to this view as in the other detail views. In Fig. 8 R represents a relay or cut-out, C is an ignition and lamp switch connecting the lamps L and the ignition I in the circuit. A is an ammeter, B is the storage battery, SW is the starting motor switch and SM is the starting motor. Wire 61 leads from the cut-out to brush 27 and wire 62 leads from brush 28 to ground. Wire 63 connects one field coil 13 to the third brush 33, and wire 52 leads from the other field coil 13 to the terminal on the frame member 40 of the thermostatic unit.

When the machine starts in operation the contacts 45 and 46 are closed (as shown in Fig. 7). The field current then flows from third brush 33 through wire 63, through field coils 13, wire 52, frame member 40, contacts 45 and 46, bimetallic thermostatic member 43, wire 51, wire 62, brush 28 and back to the commutator. With this condition the current output of the machine will have the well known inherent drooping characteristics of a third brush machine as exemplified by curve T. C. in Fig. 9.

After the machine has run for a time heating will occur in the machine and the design of the generator is such that heating will occur most rapidly at the commutator. The heat of the commutator will be conducted to the thermostatic element B and the heating will cause the bimetallic member to bow and open the circuit which previously was established through contacts 45 and 46.

The circuit now will be as follows: from brush 33, wire 63, fields 13, wire 52, frame 40, resistance 48, thermostat 43, wire 51, brush 28 and back to commutator.

The result will be that with the thermostat open, the resistance 48 will be put in series with the fields 13 and the field strength will be diminished. The output characteristic curve will be approximately like curve T O of Fig. 9. The inherent regulation characteristics of the machine will also be changed somewhat. It is apparent that one function of the thermostat is to produce a modifying effect upon the third brush regulation of the generator so as to produce an abrupt change in the generator characteristic based on speed and output. It is by this function of the thermostat that the charging of the battery may be regulated automatically in accordance with changes in temperature in the surrounding atmosphere. While the thermostat receives heat from the generator, it is apparent that the thermostat contacts will be separated after the charging begins sooner in warm weather than in cold weather.

This feature of the invention is advantageous particularly in the electrical systems of automobiles. Generally, in cold weather there is a considerable demand for current from the storage battery to operate electric lamps and the electric starting motor of the automobile engine. The supplying of this demand is provided by the present invention which causes the battery to be charged at a relatively high rate for a relatively long period. In warm weather the demand upon the storage battery is not so great on account of the starting of the engine being easier and of the decreased necessity for electric lights. The thermostat permits the continuance of the high battery charging rate only for a relatively short time, cutting down the charge rate to what the battery can stand in hot weather without injury.

It will be noted when the thermostat contacts are closed the generator output falls off relatively abruptly as the speed increases above the average driving speed, but that, when the thermostat contacts open, the generator characteristic is so modified that the output falls off less abruptly as the speed increases above the average driving speed. Therefore, although the thermostat in modifying the operation of the generator regulating devices produces a generator characteristic having a lower maximum value, yet there is less reduction in output below that maximum value as the generator speed increases above the average.

Another function of the thermostat herein described is to safeguard the machine should the battery become accidentally disconnected. Should this occur in a machine without a thermostat the voltage would rise, causing excessive field current with attendant heating effects and possibly even burn out the lamps and the field. With a thermostat equipped machine, when the battery becomes disconnected and the machine quickly heats up, the thermostat will promptly open and the excess field current due to voltage rise melts the resistance wire 48. This breaks the field circuit and protects the machine. The thermostat may then be readily replaced without disassembling the machine.

It will be understood that the curves shown are merely for purposes of simplifying the explanation, and the claims are not to be limited to a machine having the particular characteristics here illustrated. Other forms of regulators may be used in connection with the thermostat, and what I claim as my invention is more particularly pointed out in the appended claims.

I claim:—

1. In a dynamo-electric machine, the combination with an armature circuit and a field circuit; of a thermostatic regulating device adapted to coöperate with the field circuit and to be placed as a unit in heat receiving relation with the machine, said device including a frame member adapted to support the device upon the machine, a stationary contact supported by the frame member, a movable thermostatic member mounted on the frame member but insulated therefrom, a movable contact carried by the thermostatic member, a resistance element supported by the frame member and electrically connecting the frame member with the thermostatic member.

2. In a dynamo-electric machine, the combination with an armature and a field circuit; of a thermostatic regulating device adapted to coöperate with the field circuit and to be placed as a unit in heat receiving relation with the machine, said device including coöperating contacts in the field circuit, a frame member supporting one of the contacts, a thermostatic member supported by the frame member and adapted to effect the separation of the contacts when a predetermined temperature is exceeded, and a resistance element connected in parallel with the contacts.

3. In a system of regulation for dynamo-electric-machines, the combination with a variable speed dynamo; of means for regulating the output thereof in accordance with speed to obtain a predetermined characteristic based on the relation of speed and output; and separate temperature controlled means for modifying the operation of said regulating means whereby a different characteristic will be obtained.

4. In a system of regulation for dynamo-electric-machines, the combination with a variable speed dynamo and provisions for regulating the output thereof in accordance with speed to obtain a predetermined characteristic based on the relation of speed and output such that the dynamo may deliver the maximum current at a predetermined speed, and so that the output will be reduced at speeds above said predetermined speed; and temperature controlled means for modifying the operation of said regulating provisions so that the current will reach a lower maximum value at the predetermined speed.

5. In a system of regulation for dynamo-electric-machines, the combination with a variable speed dynamo and provisions for regulating the output thereof in accordance with speed to obtain a predetermined characteristic based on the relation of speed and output such that the dynamo may deliver the maximum output at a predetermined speed, and such that the output will be reduced comparatively abruptly at speeds above said predetermined speed; and temperature controlled means for modifying the operation of said regulating provisions so that the current delivered by the dynamo will reach a lower maximum value but so that the output will fall off less abruptly as the dynamo speed increases.

6. In a system of regulation for dynamo-electric-machines, the combination with a variable speed dynamo having third-brush regulating provisions for regulating the output thereof in accordance with speed to obtain a predetermined characteristic based on the relation of speed and output such that the dynamo may deliver the maximum output at a predetermined speed, and such that the output will be reduced comparatively abruptly at speeds above said predetermined speed; and temperature controlled means for modifying the operation of said regulating provisions so that the current delivered by the dynamo will reach a lower maximum value but so that the output will fall off less abruptly as the dynamo speed increases.

7. In a system of regulation for dynamo-electric-machines, the combination with a variable speed dynamo; of means for regulating the output thereof in accordance with speed to obtain a predetermined characteristic based on the relation of speed and output; and means operating at a predetermined temperature for modifying the operation of the regulating means so that there will be an abrupt change in the dynamo characteristic.

8. In a system of regulation for dynamo-electric-machines, the combination with a variable speed dynamo having third-brush regulating provisions; of temperature controlled means for modifying the action of said regulating provisions whereby to obtain a lower maximum current value at a predetermined speed, said means operating at a predetermined temperature to increase the resistance of the dynamo field circuit.

In testimony whereof I affix my signature in the presence of two subscribing witnesses.

OLIVER F. CONKLIN.

Witnesses:
C. RINGWALD,
Z. M. SMITH.